June 14, 1960  A. J. McCLELLAND  2,940,347
MACHINE TOOL
Filed Sept. 18, 1958  4 Sheets-Sheet 1

INVENTOR.
ALEXANDER J. McCLELLAND
BY
ATTORNEYS

June 14, 1960  A. J. McCLELLAND  2,940,347
MACHINE TOOL

Filed Sept. 18, 1958  4 Sheets-Sheet 4

INVENTOR.
ALEXANDER J. McCLELLAND
BY Hudson, Boughton,
Williams, David & Hoffmann
ATTORNEYS

United States Patent Office 2,940,347
Patented June 14, 1960

2,940,347
MACHINE TOOL

Alexander J. McClelland, Cleveland, Ohio, assignor to The Warner & Swasey Company, Cleveland, Ohio, a corporation of Ohio Filed Sept. 18, 1958, Ser. No. 761,806

12 Claims. (Cl. 82—14)

This invention relates to a machine tool and more particularly to an improved arrangement for a template and stylus that are operatively associated with a cross slide indexible turret of a machine tool used for contouring operations.

An object of the invention is to provide a novel and improved way to locate and mount on the cross slide indexible turret the stylus that cooperates with a template and controls contouring movements of a cutting tool or tools mounted on a face or faces of the indexible turret.

A more detailed object of the invention is to provide a manner of locating the stylus on the cross slide indexible turret in a location such that the stylus is always outside the chip area when the machine tool is performing machining operations on the work piece.

A further object is to mount a stylus on the cross slide indexible turret in a manner such that the turret can be indexed without the stylus interfering with the indexing movements.

Another object of the invention is to provide a manner of locating and mounting a stylus on the cross slide indexible turret of a machine tool which offers no restrictions to tool overhanging or the type of tooling used on the various faces of the turret.

A further object is to provide a mounting for connecting a stylus to the cross slide indexible turret of a machine tool such that the stylus can be given longitudinal and cross motion adjustments by means accessible to the operator from the front of the machine and the operator can observe the stylus from his normal working position when operating the machine.

A further object is to provide means for mounting a stylus on the cross slide indexible turret of a machine tool in a manner such that the mounting for the stylus will be accurately located, will be stable and free of play relative to the turret.

A further object of the invention is to provide means for mounting a stylus on the cross slide indexible turret of a machine tool so as to efficiently cooperate with a template for longitudinal and transverse contouring operations.

Further and additional objects and advantages inherent in the invention will become apparent hereinafter during the detailed description of an embodiment of the invention which is to follow and which embodiment is illustrated in the accompanying drawings forming a part of this specification and wherein.

Inasmuch as the invention has special utility when embodied in a machine tool of the turret lathe type which is provided with a hexagonal indexible turret mounted on a cross slide carried by the longitudinally movable saddle, it will be so described herein for purposes of illustration, it being understood that the invention could be embodied in other types of indexible turrets of machine tools.

Figure 1:
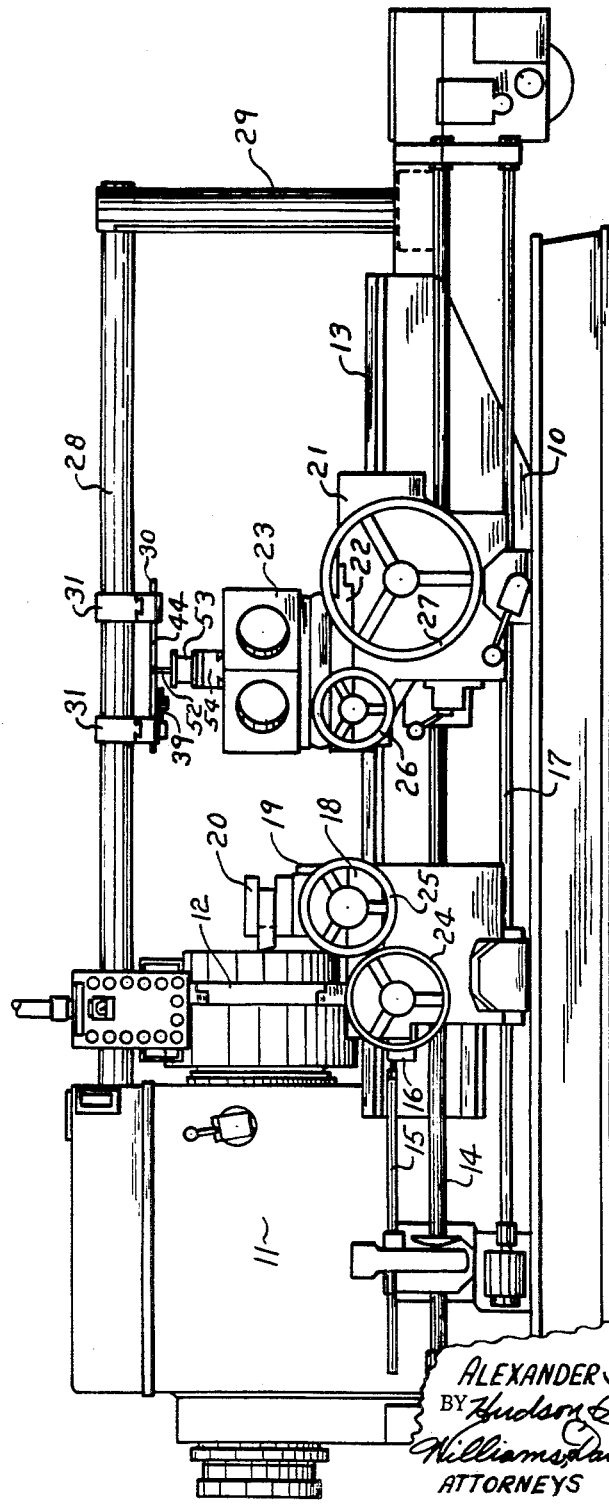
Fig. 1 is a front elevational view of a machine tool embodying the invention and in this instance, for illustrative purposes, a turret lathe of the type having a hexagonal indexible turret mounted on a cross slide carried by a longitudinally movable saddle.
Figure 2:
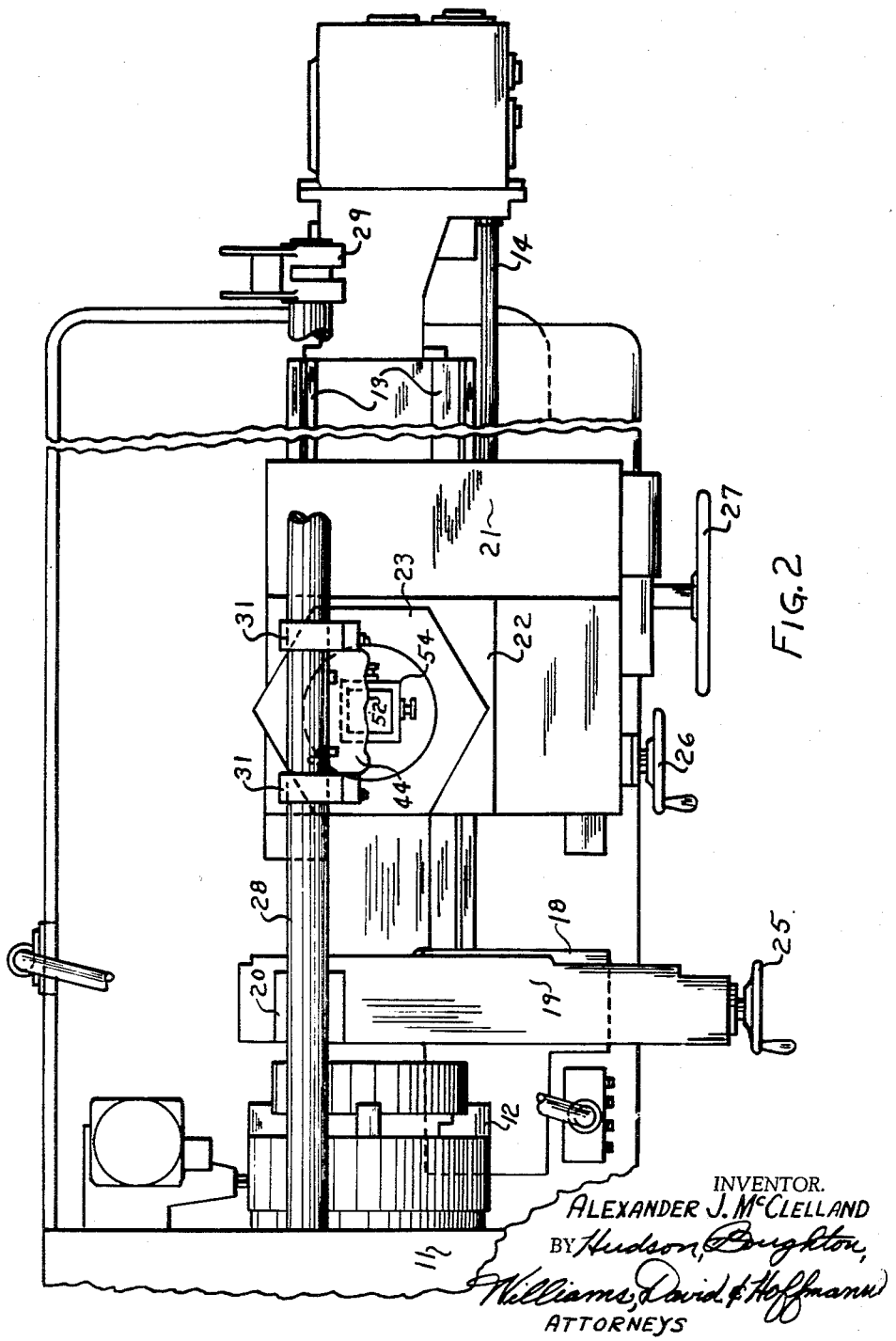
Fig. 2 is a top plan view of a portion of the machine tool shown in Fig. 1.
Figure 3:
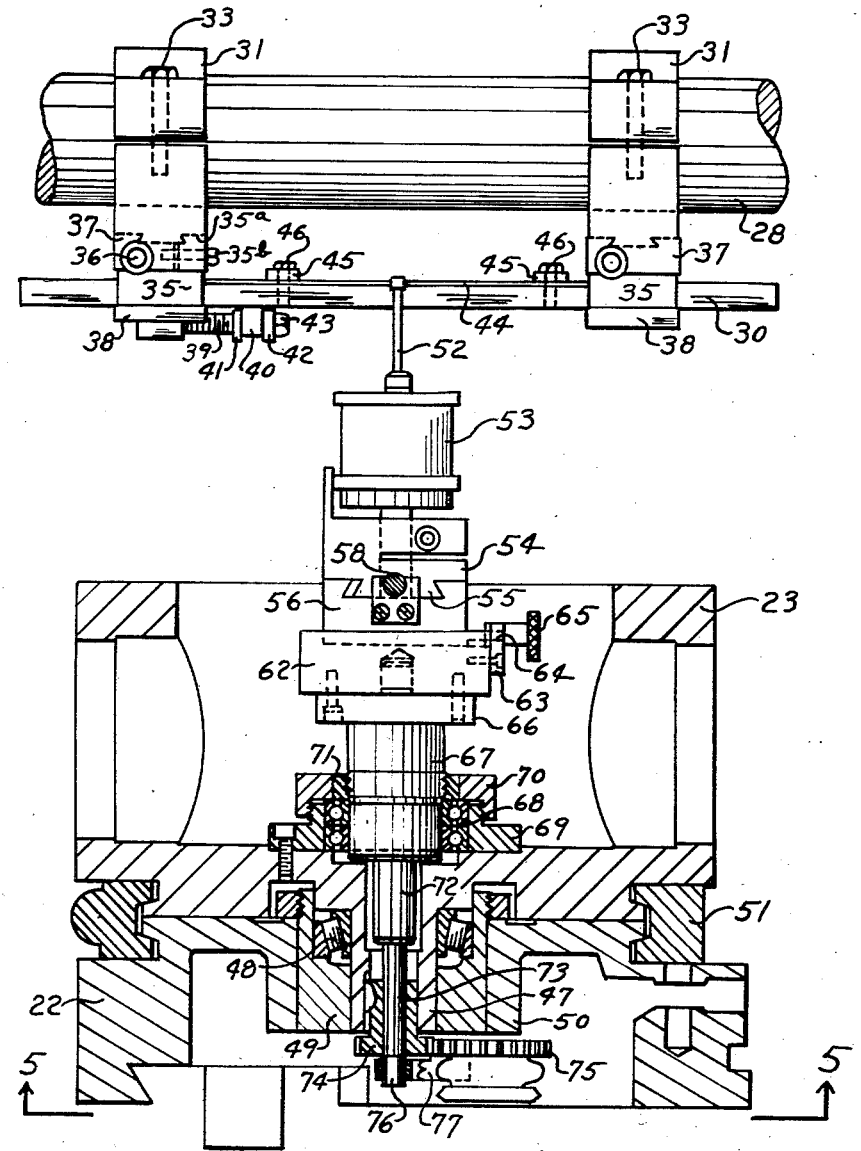
Fig. 3 is a view looking toward the front of the machine and showing the pilot bar and template carried thereby in longitudinal elevation, while the stylus and a portion of its mounting is shown in front elevation and the remaining portion of its mounting and the hexagonal turret carried by the cross slide are shown in vertical section.
Figures 4, 5:
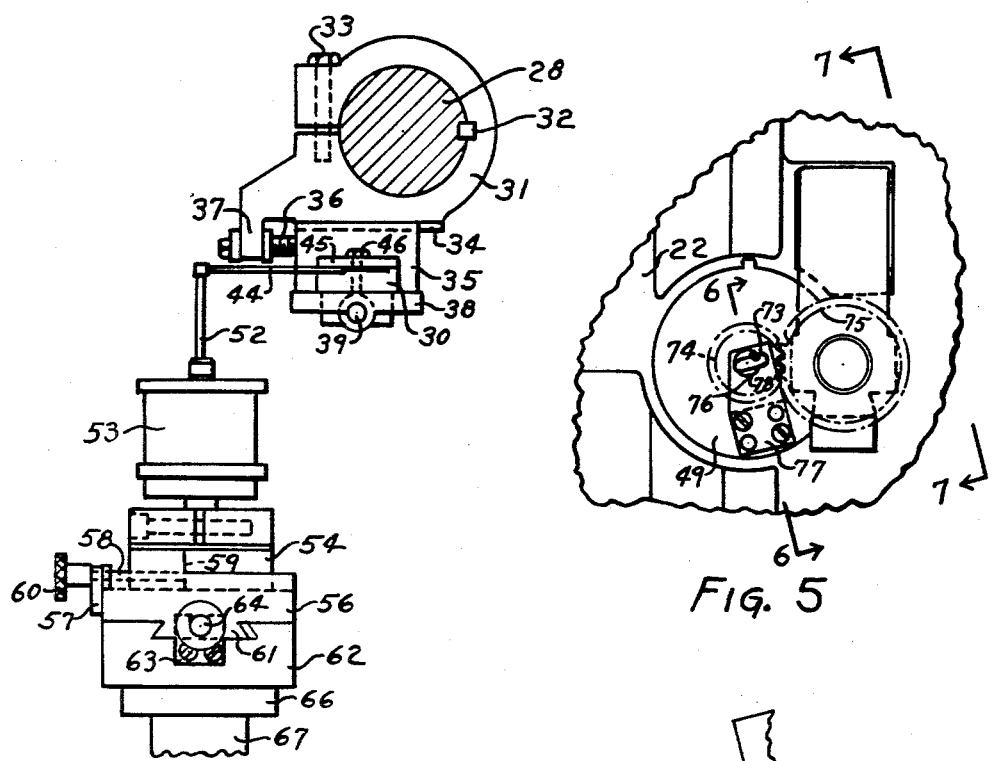
Fig. 4 is an elevational view of the stylus and a portion of its mounting on the hexagonal turret of the cross slide and is taken looking from the right-hand side of Fig. 3 with the pilot bar shown in section.
Fig. 5 is a fragmentary bottom plan view illustrating the arrangement of the lower end of the stem of the stylus mounting and which arrangement includes spring loaded means to eliminate play in the stem of the mounting.
Figure 7:
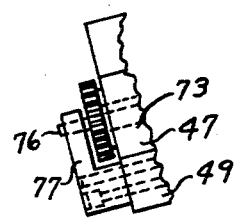
Fig. 7 is a fragmentary elevational view taken substantially from line 7—7 of Fig. 5 looking in the direction of the arrows.
Figure 6:
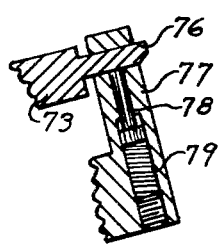
Fig. 6 is a sectional view taken substantially on line 6—6 of Fig. 5 looking in the direction of the arrows.

Referring to Figs. 1 and 2, the machine tool illustrated therein has at one end of the bed 10 thereof a headstock 11 in which is rotatably mounted a spindle provided with a chuck 12. The bed 10 is provided with a pair of parallel ways 13 extending longitudinally of the bed from the headstock toward the opposite end thereof and parallel to the axis of the spindle and chuck 12, as will be well understood in the art. The headstock 11 mounts the drive mechanism for the spindle and for the feed screw 14 that extends longitudinally of the front side of the bed. There is also provided a longitudinal stop rod 15 on the front of the headstock 11 and which stop rod cooperates with a longitudinal feed stop roll 16 carried by the front cross slide carriage 18 as will be well understood.

In addition, a rapid return shaft 17 is provided for the cross slide carriage 18 on which is mounted the front cross slide 19 having the square turret 20 and for the saddle 21 which carries the cross slide 22 for the hexagonal indexible turret 23 as will be well understood.

The handwheel 24 provides for longitudinal manual feed of the carriage 18 while the handwheel 25 provides for manual cross feed of the cross slide 19. The handwheel 26 is for manual cross feed of the cross slide 22 on the saddle 21 while the handwheel 27 is for manual longitudinal feed of the saddle 21. It will be understood that the carriage 18 and saddle 21 and also the cross slides 19 and 22 carried thereby, respectively, can be connected to the feed shaft 14 for power driven feeding movements. It is unnecessary to explain in detail the means for doing this as it forms no part of the present invention. Likewise, the rapid return shaft 17 can be operatively connnected to the carriage 18 and saddle 21 as will be well understood.

A pilot bar 28 extends longitudinally of the bed 10 above and parallel to the ways 13 and the axis of the spindle in the headstock 11, and said pilot bar is connected at one end to the headstock 11 while its opposite end, in this instance, is supported by an upstanding support 29 carried by an extension of the bed 10 and located beyond the end of the ways 13.

The machine tool thus far described is known in the art and it is not believed necessary to describe in further detail those elements or portions of the machine which do not relate directly to the present invention.

The pilot bar 28 supports an elongated template holder 30 by supporting means now to be described. A pair of split supporting members 31 embraces the pilot bar 28 and can be spaced apart longitudinally of the pilot bar a predetermined distance. The members 31 are keyed to the pilot bar as indicated at 32 and can be adjusted longitudinally of the pilot bar and then clamped thereto by clamping screws 33 which act to draw the split portions of the members 31 together. The members 31 on their undersides have dovetails 34 extending transversely of the pilot bar 28 and engaged in complementary dovetail slots formed on the upper side of sliding blocks 35. The blocks 35 include gibs 35a connected thereto by screws 35b. The blocks 35 carry fixed nuts which cooperate with adjusting screws 36. The wrench receiving ends of the adjusting screws 36 are toward the front of the machine and are rotatably supported in outwardly and downwardly extending portions 37 of the members 31. It will be seen that rotation of the screws 36 adjusts the blocks 35 in a direction transverse to the pilot bar 28 and relative to the members or supports 31.

The slide blocks 35 are provided with downwardly facing rectangular openings in which the elongated template holder 30 is slidable longitudinally of the pilot bar 28, said template holder being held in the openings in the slide blocks 35 by retaining plates 38 secured to the undersides of the slide blocks. An adjusting screw 39 is rotatably connected to one of the retaining plates 38 and extends through a fixed nut in a bearing bracket 40 secured to the template holder 30.

The adjusting screw on opposite sides of the bracket 40 is provided with collars 41 and 42 to prevent axial movement of the adjusting screw relative to the bracket 40. The end of the adjusting screw 39 adjacent to the collar 42 is provided with a polygonal wrench head 43. It will be seen that rotation of the screw 39 will effect endwise adjustment of the template holder 30 longitudinally of the pilot bar 28 and of the machine.

The template holder 30 on its upper or top side is provided with a shouldered recess or rabbet extending from the front edge of the holder toward the rear thereof and longitudinally of the holder and this recess receives the straight edge of the template 44. It will be understood that the supports 31 are spaced apart on the pilot bar 28 the proper distance to have the template located therebetween and said template is clamped to the template holder 30 by clamping members 45 overlying the template and the upper side of the holder 30 intermediate the supports 31 and secured to the holder by securing screws 46.

It will be understood that the contoured edge of the template 44 is the free edge thereof. It will also be understood that the location of the template and the template holder 30 can be adjusted transversely of the machine by rotation of the adjusting screw 36. The adjustment just referred to enables the template to be located in the proper position in relation to the diameter of the workpiece to be machined by the cutting tool located in the tool holder on a face of the turret.

It will further be understood that the template holder 30 can be adjusted longitudinally of the pilot bar 28 by rotation of the adjusting screw 39 in order to correlate the template to the longitudinal surface of the workpiece to be machined.

The hexagonal turret 23 is indexibly mounted on the cross slide 22 by means of a sleeve-like stud or mounting spindle 47 extending centrally from the underside of the turret 23 and rotatable in antifriction roller bearings 48 carried by a sleevelike bushing 49 fixedly mounted and keyed in a cylindrical bearing portion 50 of the cross slide 22. The details of the mounting of the hexagonal turret 23 on the cross slide 22 per se form no part of the present invention and are well understood in the art.

It will be understood that the turret 23 can be rotatably indexed to bring its various faces into machining position by indexing means not illustrated but well known. Also it will be understood that the turret 23 and the cross slide 22 are provided with locking means, not shown, and a binder ring 51 whereby the turret may be unlocked, unclamped, indexed and then locked and clamped in indexed position, all as is well known and hence need not be further explained herein. It will be understood that cutting tools may be mounted on the various faces of the turret 23.

As previously stated, the hexagonal turret 23 mounts a stylus 52 that cooperates with the template 44 to effect, during the operation of the machine, controlled contouring movements of the cross slide to enable a cutting tool on a face of the turret to produce on the workpiece machining cuts corresponding to the contour of the template. The mechanisms for producing the contouring movements of the cross slide and carriage in response to the movements of the stylus 52 produced by the contouring edge of the template 44 are not illustrated herein since they do not form part of the present invention and may take various forms.

As previously stated, the present invention contemplates so positioning the stylus and the contouring control element actuated by the stylus on the indexible turret in a novel and improved location and manner such that the stylus is outside of the chip area, the turret can be indexed without the stylus interfering with the indexing movement, is in such a position as not to restrict or conflict with the tools used on the various faces of the turret or the tool overhang and is so located as to be accessible and observable to and by the operator from the front of the machine.

According to the invention the stylus 52 is located centrally of the turret on the indexing axis thereof and projects upwardly from a stylus housing 53. The stylus 52 is rockably or universally mounted in a bearing located centrally of the stylus housing and the lower end of the stylus is operatively connected to a contouring control mechanism located in the housing 53 for controlling the contouring movements of the cross slide and carriage. Such mechanism may be a valve control mechanism or an electrical pickup mechanism of known construction or any other suitable mechanism for this purpose and is actuated by the stylus movements caused by the template.

The stylus housing 53 is supported by and suitably connected to a compound slide arrangement comprising a first slide 54 having on its underside a dovetail portion 55 extending into a complementary groove formed in the upper side of a second slide 56. The second slide 56 is provided with a bearing bracket 57 that rotatably mounts an adjusting screw 58 that cooperates with a nut 59 fixedly carried by the first slide 54, wherefore rotation of the adjusting screw 58 by its operating knob 60 causes adjustment of the first slide 54 relative to the second slide 56.

The second slide 56 is provided with a dovetail portion 61 which is slidable in a complementary groove formed on the upper side of a supporting block 62. The dovetail portion 61 of the second slide 56 and its complementary groove in the supporting block 62 extend in a direction at right angles to the dovetail portion 55 of the first slide 54 and its complementary groove in the second slide 56. The supporting block 62 has secured to it a bearing bracket 63 which rotatably mounts an adjusting screw 64 that cooperates with a nut fixedly carried by the second slide 56.

It will be seen that rotation of the adjusting screw 64 by its operating knob 65 causes the second slide 56 to move relative to the supporting block 62 and in a direction transverse to the adjusting movement of the first slide 54 relative to the second slide 56. Hence by means of the compound slide arrangement formed of the first and second slides 54 and 56 the stylus housing 53 and the stylus 52 can be adjusted in a plurality of horizontal directions.

The supporting block 62 is secured upon a base 66 from the underside of which extends a stem 67 of relatively large diameter. The stem 67 is rotatable in preloaded ball bearings 68, two of such bearings being illustrated herein by way of example. The bearings 68 are contained in a bearing housing 69 secured to the turret 23 centrally and internally thereof and said housing 69 is exteriorly threaded to receive a threaded cap member 70. The stem 67 has a threaded portion to receive a threaded retainer or thrust washer 71 which interfits the opening in the cap member 70 and engages the upper end of the preloaded ball bearings 68, the lower end of which engages an internal surface of the turret 23.

The lower end of the stem 67 is adjacent to the bottom of an internal counterbore in the turret 23 and has a reduced diameter stem portion 72 extending centrally and downwardly therefrom and spaced from the central bore in the sleeve-like mounting stud 47 of the turret. The lower end of the reduced diameter stem portion 72 is in the form of a shaft-like portion 73 which extends through and is rotatable in the integral sleeve of a gear 74 forming part of the indexing mechanism for the turret. The sleeve of the gear 74 is keyed within the bore through the sleeve-like stud 47 while the gear 74 is located below the lower end of said stud and meshes with another gear 75 forming part of the indexing mechanism for the turret as will be well understood.

The lower end of the shaft-like portion 73 of the stem 67 is provided with a tang 76 having oppositely flattened sides and interfitting an opening formed in a bracket 77 secured to the lower end of the bushing 49. The bracket 77 is provided with a bore communicating with the opening therein for the tang 76 and with a counterbore and said bore and counterbore mount a slidable pin detent 78, the headed end of which is engaged by a coil spring 79 in the counterbore while the opposite end thereof engages a flat side of the tang 76 to place on the tang and on the shaft-like portion 73 of the stem 67 a spring load to eliminate play in the lower end of the stem 67 and particularly the shaft-like portion 73 thereof.

It will be observed that the bracket 77 is secured to the bushing 49 that is fixedly connected to the cross slide 22 and hence does not rotate during indexing movement of the turret. Since the tang 76 of the shaft portion 73 of the stem is held in the opening in the bracket 77 it will be evident that the stylus, its mounting and the stem 67 do not rotate during indexing movement of the turret 23. When the turret 23 indexes it turns on the ball bearings 68 relative to the stem 67 and on the roller bearings 48 relative to the slide 22.

As previously explained, the template holder 30 can be adjusted transversely of the machine by rotation of the adjusting screws 36 to move the slide blocks 35 relative to the supports 31. Also the template holder 30 can be adjusted longitudinally of the machine by rotation of the adjusting screw 39.

In addition, it will be recalled that the stylus 52 and stylus housing 53 can be adjusted horizontally in a plurality of directions due to the compound slide formed of the slide elements 54 and 56 by rotation of the adjusting screws 58 and 64.

The mounting of the stylus on the indexing axis of the turret creates no interference with the indexing movements of the turret and such location results in the stylus and its housing being outside of the chip area when the cutting tool is operating on the workpiece and does not interfere with the cutting tools or any overhanging support for the tools.

Also it will have been noted that the operator standing in his usual position at the front side of the machine can observe the stylus 52 and its engagement with the template 44 and in addition can conveniently actuate the various adjusting screws for adjusting the template carrier 30 and the compound slides of the stylus mounting.

Although a preferred embodiment of the invention has been illustrated and described herein it will be understood that the invention is susceptible of various modifications and adaptations within the scope of the appended claims.

Having thus described my invention, I claim:

1. In a machine tool having a slide on which is mounted an indexible turret having a plurality of tool supporting faces, a stylus extending upwardly from said turret and adapted to engage during movement of said slide a template carried by the machine tool and to be moved by such engagement from a normal position to actuate a contouring control mechanism operatively connected to the stylus, and means for mounting said stylus to be moved to and from normal position substantially centrally of the turret and substantially on the indexing axis thereof and such that the turret can have indexing movement relative to said means as a center and said stylus will have substantially the same relationship to each tool supporting face of the turret.

2. In a machine tool as defined in claim 1 wherein said means for mounting said stylus includes cooperating interengaging parts restraining said means against rotation, one of said cooperating parts being connected to a portion of the slide.

3. In a machine tool as defined in claim 1 wherein said means for mounting said stylus includes a compound slide arrangement formed of slides movable in transverse paths and adjusting mechanism operatively associated with the slides of said compound slide arrangement to adjust said slides in different directions to impart horizontal adjusting movements to said stylus in different directions.

4. In a machine tool as defined in claim 1 wherein said means for mounting said stylus includes a stem extending centrally through said turret and said slide of the machine tool on the indexing axis of said turret and having an enlarged cylindrical portion mounted in preloaded antifriction bearings carried by said turret and on which said turret has indexing rotation.

5. In a machine tool as defined in claim 1 wherein said slide of the machine tool is a cross slide carried by a longitudinally movable saddle while said indexible turret is a polygonal faced turret carried by said cross slide.

6. In a machine tool having a slide mounting an indexible turret having a plurality of tool supporting faces, a stylus extending upwardly from said turret and adapted to engage during movement of said slide a template carried by the machine tool and to be moved by such engagement from a normal position to actuate a contouring control mechanism operatively connected to said stylus, and means for mounting said stylus to be moved to and from normal position substantially centrally of the turret and on the indexing axis thereof and comprising a stylus housing provided with a bearing rockably mounting said stylus and adapted to contain the control mechanism that is operatively connected to said stylus, said housing being carried by a compound slide providing adjustment of said stylus horizontally in a plurality of directions, said compound slide being secured to a base having a stem extending centrally through the turret and through said machine tool slide and coaxial with the indexing axis of said turret, said stem having a large diameter portion mounted in preloaded bearings carried by said turret and a reduced diameter shaft-like portion having an end that is interlocked with a bracket member secured to said machine tool slide, wherefore said means for mounting said stylus is held against rotation while said turret can indexibly rotate relative thereto.

7. In a machine tool as defined in claim 6 wherein said machine tool slide is a cross slide on a longitudinally movable saddle, while said turret is a hexagonal turret carried by the cross slide.

8. In combination, a machine tool having a bed at one end of which is a headstock, a slide mounting an indexible turret having a plurality of tool supporting faces carried by said bed, a pilot bar supported by said headstock and said bed and overlying the latter and parallel thereto, a template carried by said pilot bar, a stylus extending upwardly from said turret and engaging said template during movement of said slide to be moved by such engagement from a normal position and adapted to actuate a contouring control mechanism operatively connected to said stylus, and means for mounting said stylus to be moved to and from normal position substantially centrally of the turret and on the indexing axis thereof and such that the turret will have indexing movement relative to said stylus mounting means as a center.

9. The combination defined in claim 8 wherein said template is carried by a template holder supported by said pilot bar and means is provided for adjusting said template holder in a direction transverse to said pilot bar and in a direction longitudinally thereof.

10. The combination defined in claim 9 wherein supports spaced longitudinally of said pilot bar are clamped thereto and mount slide blocks adjustable transversely of said pilot bar, while said slide blocks slidably mount said template holder for adjustment longitudinally of said pilot bar.

11. The combination defined in claim 9 wherein said means for mounting said stylus centrally of the turret includes a stylus housing provided with a bearing supporting said stylus and adapted to contain a contouring control mechanism to which said stylus is operatively connected, a compound slide supporting said housing, means for adjusting the slide elements of said compound slide to impart adjustment horizontally to said stylus in a plurality of different directions, a base mounting said compound slide and provided with a stem extending centrally through said turret on the indexing axis thereof and through said slide and including a portion mounted in preloaded bearings carried by said turret, and means carried by said slide and interlocking with a portion of said stem to restrain said stem and the means for mounting said stylus against rotation.

12. The combination defined in claim 11 wherein said slide is a cross slide mounted on a longitudinally movable saddle and said indexible turret is a hexagonal turret.

References Cited in the file of this patent

FOREIGN PATENTS

| | | |
|---|---|---|
| 25,671/30 | Australia | Mar. 14, 1931 |
| 776,585 | Great Britain | June 12, 1957 |
| 1,150,862 | France | Aug. 19, 1957 |